(12) United States Patent
Morris et al.

(10) Patent No.: US 7,406,224 B2
(45) Date of Patent: Jul. 29, 2008

(54) DIFFRACTIVE COUPLER OPTIMIZED FOR ALIGNMENT TOLERANCES

(75) Inventors: James E Morris, Lake Wylie, SC (US); Michael R Feldman, Huntersville, NC (US)

(73) Assignee: Tessera North America, Inc., Charlotte, NC (US)

( * ) Notice: Subject to any disclaimer, the term of this patent is extended or adjusted under 35 U.S.C. 154(b) by 0 days.

(21) Appl. No.: 11/211,100

(22) Filed: Aug. 25, 2005

(65) Prior Publication Data

US 2006/0045423 A1 Mar. 2, 2006

Related U.S. Application Data

(63) Continuation of application No. PCT/US2004/005329, filed on Feb. 24, 2004.

(60) Provisional application No. 60/449,657, filed on Feb. 25, 2003.

(51) Int. Cl.
G02B 6/32 (2006.01)
G02B 6/34 (2006.01)

(52) U.S. Cl. ............................................ 385/37; 385/33
(58) Field of Classification Search .................. 385/33
See application file for complete search history.

(56) References Cited

U.S. PATENT DOCUMENTS

| | | | | |
|---|---|---|---|---|
| 5,420,953 A | | 5/1995 | Boudreau et al. | |
| 5,511,140 A | * | 4/1996 | Cina et al. | 385/93 |
| 5,774,239 A | | 6/1998 | Feldman et al. | |
| 5,946,140 A | * | 8/1999 | Huang | 359/641 |
| 6,012,852 A | | 1/2000 | Kadar-Kallen et al. | |
| 6,243,513 B1 | * | 6/2001 | Wade | 385/24 |
| 6,956,992 B2 | * | 10/2005 | Coleman | 385/33 |
| 2003/0012496 A1 | * | 1/2003 | Yamagata et al. | 385/33 |
| 2004/0101238 A1 | * | 5/2004 | Coleman | 385/33 |
| 2004/0223705 A1 | * | 11/2004 | Kropp | 385/93 |

OTHER PUBLICATIONS

Feldman, et al., "Holographic Optical Interconnects for VLSI Multichip Modules", Proceedings of the Electronic Components and Technology Conference. (ECTC), San Diego, CA, (US), vol. Conf. 42, pp. 513-518 (May 18, 1992).

Feldman, et al., "Diffractive Optics for Packaging of Laser Diodes and Fiber-Optics", Electronic Components and Technology Conference, 1996. Proceedings, 46th Orlando, FL (US), pp. 1278-1283 (May 28, 1996).

Rowlette, Sr., et al., "Achromatic Holographic Optical Elements, for Coupling Laser Diode to Single Mode Fiber", Lasers and Electro-Optics Society Annual Meeting, 1993, LEOS '93 Conference Proceedings, IEEE San Jose, CA (US), pp. 474-475 (Nov. 15, 1993).

* cited by examiner

*Primary Examiner*—M. R. Connelly-Cushwa
*Assistant Examiner*—Chris Chu
(74) *Attorney, Agent, or Firm*—Lee & Morse, P.C.

(57) ABSTRACT

A diffractive coupler coupling light between an opto-electronic element and a waveguide minimizes variation in coupling over an offset range, while providing good coupling efficiency. The offset range may be along the optical axis and/or radial. The diffractive coupler has a long depth of field and no best focus.

15 Claims, 3 Drawing Sheets

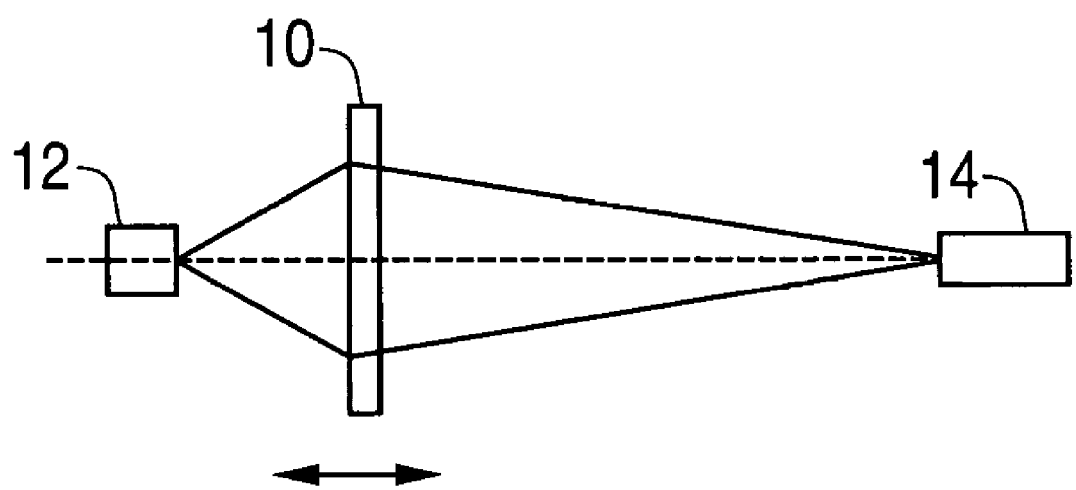
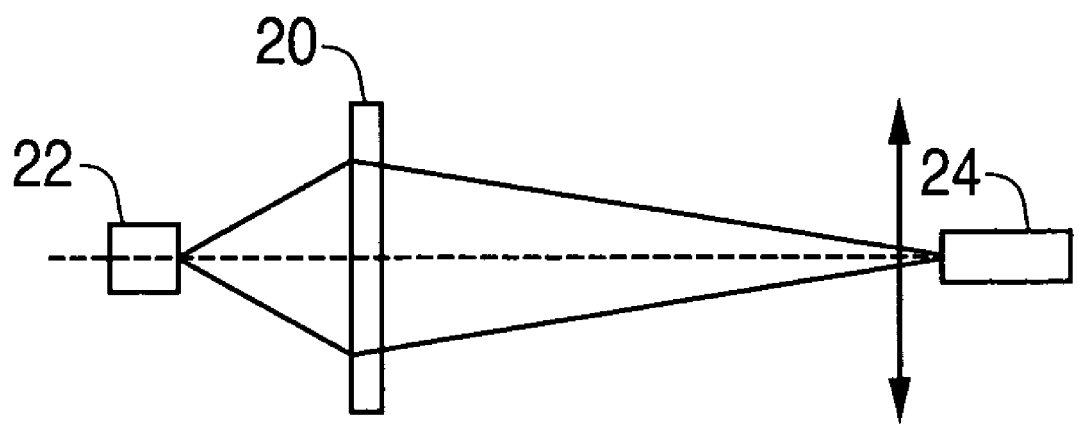

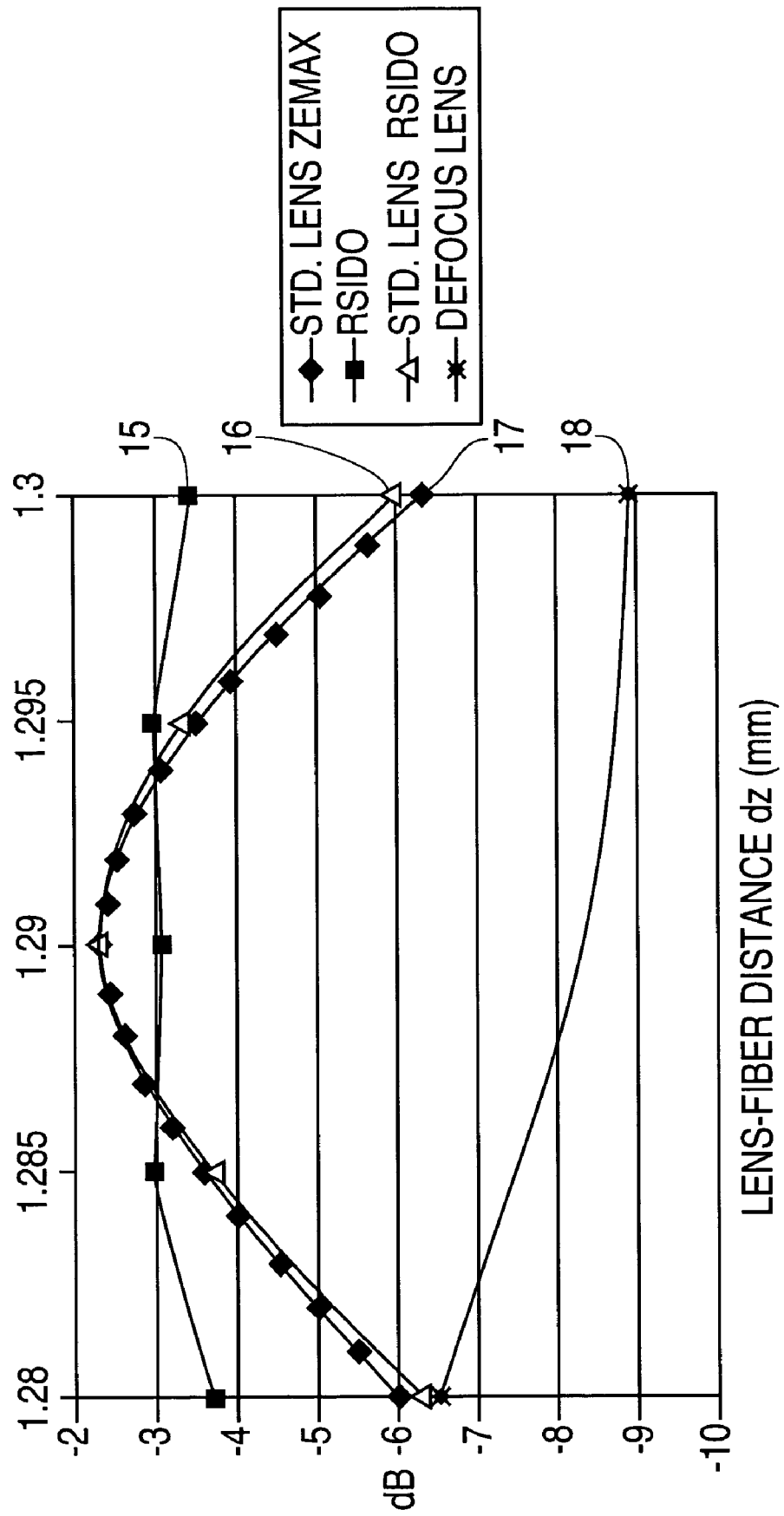

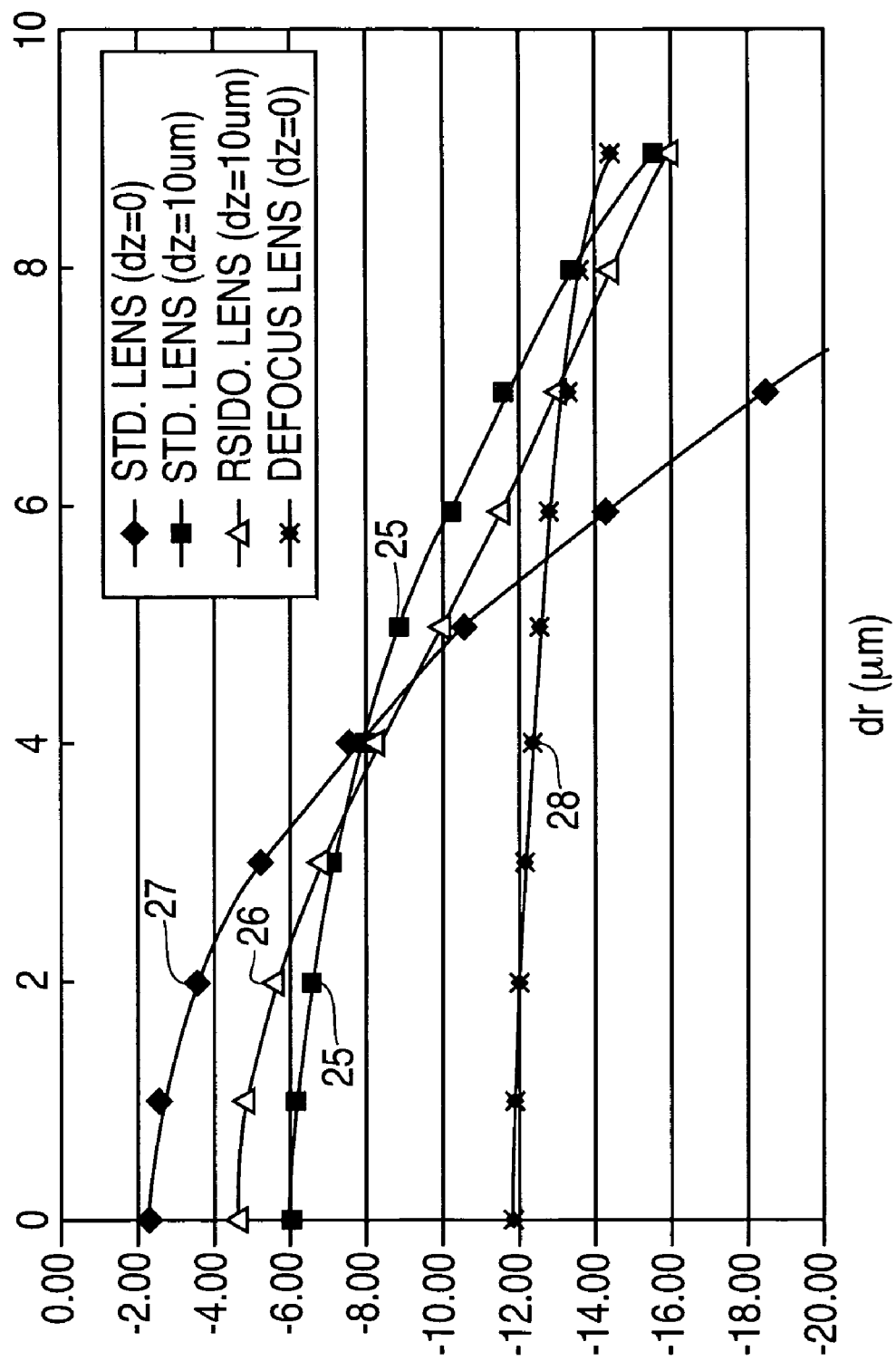

DIFFRACTIVE COUPLER OPTIMIZED FOR ALIGNMENT TOLERANCES

CROSS-REFERENCE TO RELATED APPLICATION

The present application is a continuation application of International Application No. PCT/US2004/005329, filed on Feb. 24, 2004, the entire contents of which are incorporated herein by reference for all purposes.

BACKGROUND OF THE INVENTION

1. Field of the Invention

The present invention is directed to a diffractive coupler for use with a waveguide, especially for providing sufficient coupling within operational conditions.

2. Description of Related Art

There are many designs of optical couplers that couple light between an active element, e.g., a light source or a detector, and a waveguide, e.g., a fiber. Use of coupled systems in the field typically involves changing relative positioning between the transmitter/receiver and the waveguide. These changes may arise, for example, from vibrations in use, replacement or alteration of components in the system. Variations in coupling performance due to these changes are highly undesirable. They are generally referred to as "fiber wiggle."

One solution for reducing fiber wiggle includes actively aligning a coupling refractive lens, often an aspheric lens, in the z-direction, where z is along the fiber axis, to maximize the power being coupled. Then the lens is moved out of focus to create a larger spot. This larger spot allows coupling performance to be maintained within a desired range when the active element and the fiber are moved relative to one another in any direction. However, the larger spot reduces the coupling efficiency.

Alternatively or additionally, fiber wiggle may be reduced by decreasing the magnification of the lens performing the coupling. To achieve maximum coupling, the magnification of the lens matches the ratio between the numerical aperture of the active element and the numerical aperture of the fiber. However, due to this large magnification, small variations in the position of the active element appear as larger shifts on the fiber. By reducing this magnification, the apparent shift is smaller, making the system less sensitive to fiber wiggle. Again, this solution allows coupling performance to be maintained within a desired range when the active element and the fiber are moved relative to one another, but with reduced resultant coupling efficiency.

SUMMARY OF THE INVENTION

The present invention is therefore directed to coupler which substantially overcomes one or more of the problems due to the limitations and disadvantages of the related art.

It is a feature of the present invention to provide a high coupling efficiency over a range of relative positioning between an active element and a waveguide. It is a further object of the present invention to provide coupling which is insensitive to changes in relative positioning along both the z-direction and radially. It is another feature of the present invention to provide a method for designing such a coupler.

At least one of the above and other feature may be realized by providing a system including an active element, a waveguide, and a diffractive element coupling light between the active element and the waveguide. There is a range of relative positioning between the active element and the waveguide. An average coupling efficiency of the diffractive element across the range is greater than an average coupling efficiency of an optimized refractive lens.

The range may be along the z-axis and/or radial. The diffractive element is radially symmetric. The diffractive element may be designed with iterative encoding, which may include maximizing coupling efficiency over the range and minimizing changes in coupling efficiency over the range. The iterative encoding may include selecting at least two point within the range along the z-axis and minimizing variation in coupling from radial offset. The diffractive element may output no completely focused spot. The range may be ±50 µ and a coupling efficiency of the diffractive element may decrease by less than 1 dB.

At least one of the above and other feature may be realized by providing a method of designing a radially symmetric diffractive coupling element including selecting a z range along an optical axis of the diffractive coupling element, selecting a radial range of the diffractive coupling element, selecting a number of discrete points along the radial rang, and minimizing variation of coupling efficiency at the number of discrete points while maximizing coupling efficiency over the z range.

BRIEF DESCRIPTION OF THE DRAWINGS

The above and other features and advantages of the present invention will become readily apparent to those of skill in the art be describing in detail embodiments thereof with reference to the attached drawings, in which:

FIG. 1 is a schematic side view of a coupler for decreasing sensitivity along the z-axis;

FIG. 2 is a plot of lens-fiber distance along the x-direction versus the coupling for conventional lenses and the coupler of the present invention;

FIG. 3 is a schematic side view of a coupler for decreasing sensitivity along the x-axis; and FIG. 4 is a plot of offset along the radial direction versus the coupling for conventional lenses and for the coupler of the present invention.

DETAILED DESCRIPTION

U.S. Provisional Patent Application No. 60/449,657, filed on Feb. 25, 2003, entitled "Diffractive Coupler Optimized for Alignment Tolerances" is herein incorporated by reference in its entirety for all purposes.

A diffractive optical element may be designed to perform multiple functions, e.g., it can be designed to provide the same focus at different depths. In accordance with the present invention, a diffractive coupler is designed there is no best focus, i.e., that never completely focuses the beam. In other words, the diffractive coupler does not create a diffraction-limited spot. Such a design increases the resultant depth of field, i.e., the distance in the z-direction over which an acceptable image, here acceptable coupling, is obtained. The exact value of the acceptable coupling will depend upon the application. This increased depth of field means that the system is less sensitive to misalignment in the z-direction, since the image can look the same across a desired range in the z-direction.

This reduced sensitivity also allows passive alignment rather than active alignment to be used. The coupling over the desired z-direction range can be maximized. Thus, the diffractive coupler of the present invention can provide a higher and more uniform coupling efficiency than provided by a refractive coupler. Since the characteristics of the multiple functions of the diffractive coupler can be controlled, better trade-offs between coupling efficiency and positioning insensitivity can be realized.

Examples of optimized diffractive couplers are shown in FIGS. 1 and 3. In FIG. 1, the diffractive coupler 10 couples light between the active element 12 and the waveguide 14. As indicated in FIG. 1, the diffractive coupler 10 may be moved over a desired range in the z-direction, here ±10 µm.

FIG. 2 compares the coupling of this diffractive coupler, indicated by plot 15, with that of conventional refractive couplers, indicated by plots 16-18, over the ±10 µm range. In particular, plot 16 is for a standard refractive lens, pot 17 is for a radially symmetric standard lens, and plot 18 is for a defocused standard lens. As can be seen therein, while the standard lenses may provide slightly higher peak coupling, the diffractive coupler 10 provides higher and more uniform coupling over this range. Further, while the defocuses lens provides more uniform coupling than the standard lens, the coupling efficiency is much lower than for the diffractive coupler, and the coupling efficiency is still not as uniform. Indeed, the efficiency of the diffractive coupler drops by less than 1 dB over the entire ±50 µm range shown.

In FIG. 3, the diffractive coupler 20 couples light between the active element 22 and the waveguide 24. As indicated in FIG. 3, the diffractive coupler 10 may be moved over a desired range in the x-direction, here ±3-5 µm. Here, the diffractive coupler 20 is further optimized along the radial direction, as well as along the z-axis, for some expected range of movement in the radial direction.

The coupling of the diffractive coupler 20 over this range of movement while being misaligned in z by 10 µm is shown in plot 25 in FIG. 4. As can be seen therein, the coupling drops by 0.3 dB over a 3 µm change along in the radial direction, here shown as over the x-direction. Plot 26 shows the change in coupling efficiency for a standard lens also defocused by 10 µm. Plot 27 shows the variation for the standard lens with no defocus. Plot 28 has been defocused to provide more uniform coupling across the range. As can be seen therein, the standard lens in or out of focus provided higher coupling efficiency if there is no radial offset, their efficiency rapidly approaches and then falls below that of the diffractive coupler. While the defocus lens provides more uniform coupling, the efficiency is far lower than that of the diffractive coupler for most of the range displayed.

Such diffractive couplers may be designed using an optimizing design technique, such as that set forth in U.S. Pat. No. 5,202,775, which is herein incorporated by reference in its entirety. By selecting the error function in accordance with desired performance, a diffractive coupler may be optimized. For the diffractive coupler, this optimization relies on the coupling efficiency to provide the error function. For example, along the z-axis, the change in the coupling efficiency due to changes in position is minimized while the overall coupling efficiency is maximized. For the radial optimization, a number of points in the range along the z-axis are selected and variation between radial offset is minimized while maximizing coupling efficiency. Once the design has been determined, the diffractive coupler may be created with conventional techniques.

In practice, the active element of the system will typically be fixed. The diffractive coupler of the present invention may then be passively aligned to the active element and the fiber passively aligned thereto. Active alignment maybe employed for the radial direction or both radial and z alignment. Since the diffractive coupler is designed to tolerate wiggle, the active alignment may include maximizing the coupling, without using the intentionally introduced errors, such as defocus.

Embodiments of the present invention have been disclosed herein and, although specific terms are employed, they are used and are to be interpreted in a generic and descriptive sense only and not for purpose of limitation. For example, while a purely diffractive coupler is disclosed herein, a hybrid optical element including a refractive portion may be used to reduce the power in the diffractive element, thereby increasing the coupling efficiency. Accordingly, it will be understood by those of ordinary skill in the art that various changes in form and details may be made without departing from the spirit and scope of the present invention as set forth in the following claims.

What is claimed is:

1. A system comprising:
   an active element;
   a waveguide; and
   a diffractive optical element coupling light between the active element and the waveguide, the diffractive optical element being radially symmetric, having no focal length and distributing light incident at any point thereon substantially evenly over a range of foci.

2. The system as claimed in claim 1, wherein the diffractive element is designed with iterative encoding.

3. The system as claimed in claim 2, wherein the iterative encoding includes maximizing coupling efficiency over the range and minimizing changes in coupling efficiency over the range.

4. The system as claimed in claim 3, wherein the iterative encoding includes selecting at least two points within the range along the z-axis and minimizing variation in coupling from radial offset.

5. The system as claimed in claim 1, wherein there is a range of relative axial positioning between the active element and the waveguide, the range being at least about ±10 µm and a coupling efficiency of the optical element across the range varies by less than about 1 dB.

6. The system as claimed in claim 5, wherein the range is at least about ±50 µm.

7. The system as claimed in claim 1, wherein there is a range of relative axial positioning between the active element and the waveguide, the range being centered on an aligned position, and a coupling efficiency at each position across the range is greater than about 5 dB.

8. The system as claimed in claim 7, wherein the range is at least about ±10 µm.

9. The system as claimed in claim 8, wherein the coupling efficiency of the optical element varies by less than about 1 dB over the range.

10. The system as claimed in claim 7, wherein the range is at least about ±50 µm.

11. The system as claimed in claim 10, wherein the coupling efficiency of the optical element varies by less than about 1 dB over the range.

12. The system as claimed in claim 7, wherein the coupling efficiency of the optical element decreases by less than about 1 dB over the range.

13. The system as claimed in claim 1, wherein there is a range of relative radial positioning between the active element and the waveguide, the range being at least about ±8 µm and a coupling efficiency of the optical element across the range varies by less than about 2 dB.

14. The system as claimed in claim 13, wherein the range is about ±5 µm and a coupling efficiency of the optical element across the range varies by less than about 1 dB.

15. The system as claimed in claim 14, wherein the range is about ±3 µm and a coupling efficiency of the optical element across the range varies by less than about 0.3 dB.

* * * * *